United States Patent Office 3,285,888
Patented Nov. 15, 1966

3,285,888
INTERPOLYMERS COMPRISING N-ALKYL ACRYLAMIDES, CERTAIN ACRYLIC ESTERS AND/OR N-VINYL PYRROLIDONE
Francis W. Brown, West St. Paul, and Frederick L. Keck, Mendota Heights, Minn., assignors to Minnesota Mining and Manufacturing Company, St. Paul, Minn., a corporation of Delaware
No Drawing. Filed July 5, 1963, Ser. No. 293,173
9 Claims. (Cl. 260—80.5)

This invention relates to adhesive compositions and is particularly concerned with spreadable liquid adhesive cements which are resistant to gelation during storage but which strongly bond plasticized polyvinyl chloride articles to solid substrates such as steel upon mere evaporation of solvent at room temperature. On the other hand, dried films of the novel adhesive cements can be reactivated by heat or solvent to form bonds of strength and durability equivalent to those made with the liquid adhesive cement.

Plasticized vinyl resin films are widely used as decorative and protective coverings, being tough and resistant to wear. These films are often used as coverings for suitcases or automobile arm rests, scuff pads for automobile doors, and more recently have been imprinted with wood-grain patterns and adhered to economy-grade plywood as decorative wall paneling. Since the plasticizer of such vinyl resin films has a tendency to migrate into and soften or weaken the adhesive, few adhesive cements are useful for such purpose. Furthermore, some of the otherwise useful adhesives tend to discolor light-colored vinyl film while others require the application of heat to form strong bonds to some substrates, more heat than is desirable to apply to certain decorative vinyl film, and in many applications it is not convenient to use heat.

Plasticized vinyl resin extrusions are used for applications such as seal-strips for refrigerator doors, but only to a limited extent because of adhesion problems.

An adhesive cement used in the prior art for plasticized vinyl resin articles consists of a solution of the copolymer of equal parts of ethyl arcylate and N-vinyl-2-pyrrolidone. This cement is colorless and forms excellent nonstaining bonds to the vinyl articles at room temperature, but should be heated to about 140°–160° F. to form a good bond to steel. Furthermore, its resistance to water or to high humidity is too low for really practical use. The present invention is based on the discovery that by adding in certain proportions a third monomer in the polymerization of said prior art copolymer, the advantages of that copolymer are retained and the disadvantages are for practical purposes eliminated, insofar as the bonding of decorative vinyl resin film or other plasticized vinyl articles to common substrates is concerned. In fact, under certain circumstances the N-vinyl-2-pyrrolidone monomer need not even be used in making up the copolymer.

In short, the adhesive of this invention comprises a novel copolymer of monomers comprising (1) about 40–75 parts by weight of certain acrylates, (2) about 15–45 parts of certain acrylamides, and (3) about 10–30 parts of N-vinyl-2-pyrrolidone.

The acrylate should be at least one monomer selected from:

(a) tetrahydrofurfuryl acrylate; and
(b) alkyl acrylates having 1–8 carbon atoms in the alkyl substituent.

Up to one-half or more of these acrylates may be replaced by alkyl methacrylates having about 1–12 carbon atoms in the alkyl substituent or by alkoxyalkyl acrylates having about 2–8 carbon atoms in the alkoxyalkyl substituent. Of the acrylates, ethyl acrylate is favored because of low cost and availability. Tetrahydrofurfuryl acrylate provides adhesives of better resistance to heat and of especially good moisture resistance but is not as readily obtainable commercially. When the acrylate is tetrahydrofurfuryl acrylate, it has been found that the N-vinyl-2-pyrrolidone need not be present.

The acrylamide is at least one monomer selected from N-alkyl-acrylamide and N-alkyl-methacrylamide wherein the alkyl group has 1–8 carbon atoms. N-tertiary-butyl acrylamide provides especially good results and is commercially available in good quantity. In any event, the acrylamide should comprise at least about 15% of the total weight of monomer in the copolymer for effectively high resistance of the adhesive bonds to moisture. The cost of using much more than about 30% is somewhat high at present market prices, and in some cases the adhesive may be harder than is desirable for use with plasticized vinyl resin film.

The inclusion of small amounts of various other copolymerizable ethylenically unsaturated monomers is contemplated. Included are acrylic acid, methacrylic acid, acrylamide and methacrylamide.

The inherent viscosity of the novel copolymer as measured in methyl ethyl ketone at a concentration of approximately 0.2 gram per 100 ml. should fall within the range of 0.5 to 1.7. The copolymer is difficult to make if the inherent viscosity is to be above this range, whereas bonds formed with the adhesives based on copolymers below this viscosity range are somewhat weak cohesively. When the inherent viscosity exceeds 1.0, the adhesive may be somewhat harder than is desired, in which case the copolymer should be blended with elastomeric material. For use in liquid adhesive cement compositions, the inherent viscosity of the copolymer is preferably within the range of about 0.7 to 1.0 in order to provide a nice coatable viscosity in the order of 500 centipoises at room temperature at an especially desirable proportion of copolymer solids to volatile solvent, e.g., 25% solids.

The following examples illustrate typical copolymers of this invention which have utility as adhesives for plasticized vinyl resin articles.

Example 1

7.2 grams of N-tertiary-butyl acrylamide and 16.8 grams of tetrahydrofurfuryl acrylate were charged into a 3-ounce glass bottle. To this was added 56 grams of acetone which contained 0.072 gram of alpha, alpha'-azodiisobutyronitrile initiator which had been purged with nitrogen. The bottle was sealed with a polyethylene film and the area above the liquid in the bottle was purged with nitrogen through a hypodermic needle for 30 seconds. The bottle was then capped and placed in a bottle polymerizer (water bath) at 55° C. for 48 hours. The inherent viscosity of the resultant polymer was 0.90 as measured in methyl ethyl ketone at a concentration of 0.26 gram per 100 ml.

Three coats of the product solution were brushed on canvas duck and two coats were brushed on unsupported plastized polyvinyl chloride film of 17 mils thickness. Abtut 20–30 minutes elapsed between coats, with the final coats applied at the same time. When the final coat on the vinyl film had dried to a slightly tacky condition, the coated surfaces were joined using a hand-roller with normal arm pressure. In the same manner a bond was formed between unsupported plasticized polyvinyl chloride film and a clean steel panel, except using two coats on the vinyl and one on the steel. In each case the bonding adhesive layer was about 3 mils in total thickness.

After drying for one day at room temperature, the assemblies were cut into one-inch strips, some of which were tested immediately and others after aging as indicated below. The strips were peeled apart at 180° in a tensile test machine (Scott Tensile Tester) at a jaw separation speed of two inches per minute, readings being taken after the resistance to peel reached a constant level. Average results in pounds per inch width were:

|  | Vinyl/Canvas | Vinyl/Steel |
| --- | --- | --- |
| One day at room temperature | 7 | 11 |
| Seven days at R.T. | 15 | 18 |
| Seven days at R.T., plus 1 day at 100% relative humidity | 8 | 15 |
| Seven days at R.T., plus 11 days at 100% relative humidity | 7 | 10 |

These are excellent peel-resistance values for the bonding of plasticized vinyl resin film.

Other one-inch strips cut from the same assemblies were tested for resistance to migration of the plasticizer at high temperatures by placing strips which had been dried for three days at room temperature in an air-circulating oven for three days at 160° F. After cooling to room temperature, the vinyl/canvas bonds showed a resistance to 180° peelback of 12 pounds per inch width, and the vinyl/steel bonds showed an average peelback resistance of 15 pounds per inch width. This is an excellent showing of resistance to plasticizer migration at elevated temperature, particularly in view of the formation of the bonds at room temperature.

*Example 2*

A polymer was prepared following the procedure of Example 1 using 6.0 grams of N-tertiary butyl acrylamide, 6.6 grams of tetrahydrofurfuryl acrylate, 6.6 grams of ethyl acrylate and 4.8 grams of N-vinyl-2-pyrrolidone and 0.072 gram of the same initiator. The product polymer solution was employed to form vinyl/canvas and vinyl/steel bonds and tested in peelback as in Example 1 with the following average results in pounds per inch width:

|  | Vinyl/Canvas | Vinyl/Steel |
| --- | --- | --- |
| One day at room temperature | 12 | 13 |
| Three days at R.T. | 13 | 14 |
| Three days at R.T., plus 1 day at 100% relative humidity | 13 | 13 |
| Three days at R.T., plus 10 days at 100% relative humidity | 10 | 3 |
| Three days at R.T., plus 3 days at 160° F. | 18 | 10 |

*Example 3*

| | Pounds |
| --- | --- |
| Acetone | 379.2 |
| Ethyl acrylate | 115.5 |
| N-vinyl-2-pyrrolidone | 42.0 |
| N-tert-butyl acrylamide (includes 15% water) | 61.8 |
| Tert-dodecyl mercaptan | 0.147 |
| Azodiisobutyronitrile initiator of Example 1 | 0.525 |

To a clean 75-gallon glass-lined kettle was added in the order listed all ingredients except the initiator. Purging with nitrogen was begun with care, together with heating under mild agitation. When the temperature leveled off at about 131° F., the initiator was added. After approximately 20 minutes, the nitrogen was shut off and the kettle sealed, the pressure being 2–3 p.s.i. After 20 hours of reaction time maintained at 131° F., the batch was cooled to room temperature and filtered. The inherent viscosity of the polymerized product was about 0.90.

A product solution prepared as above-described was diluted with acetone to 25% solids and brush-coated on unsupported plasticized polyvinyl chloride film, canvas duck and steel and tested for 180° peelback as in Example 1 with the following results in pounds per inch width:

|  | Vinyl/Canvas | Vinyl/Steel |
| --- | --- | --- |
| One day at room temperature | 9 | 12 |
| Seven days at R.T. | 20 | 17 |
| Seven days at R.T., plus 1 day at 100% relative humidity | 15 | 19 |
| Seven days at R.T., plus 10 days at 100% relative humidity | 15 | 5 |
| Seven days at R.T., plus 3 days at 160° F. | 18 | 10 |

The product solution of this example was also knife-coated (11-mil orifice) on a low-adhesion carrier (polyethylene faced) and dried at room temperature to provide an adhesive bonding film about 2 mils in thickness. This film was stripped from the low-adhesion carrier and laid on a clean steel panel which was then warmed to about 195° F. Unsupported plasticized polyvinyl chloride film was placed against the adhesive film and the assembly was immediately passed between nip rolls. After cooling to room temperature, the vinyl film was found to be firmly adherently bonded to the steel.

This dried, solvent-free bonding film has also been solvent-reactivated to form strong bonds between plasticized vinyl resin articles and solid substrates such as steel.

We claim:
1. A liquid adhesive cement which is resistant to gelation during storage, air-dried coatings of which strongly bond plasticized polyvinyl chloride film to solid substrates, said adhesive cement being a spreadable liquid in a volatile solvent of a polymer of monomers comprising (1) 40–75 parts by weight of at least one member selected from the group consisting of (a) tetrahydrofurfuryl acrylate and (b) alkyl acrylates having 1–8 carbon atoms in the alkyl substituent; (2) 15–45 parts of at least one member selected from the group consisting of N-alkyl acrylamide and N-alkyl-methacrylamide wherein the alkyl group has 1–8 carbon atoms; and (3) 10–30 parts of N-vinyl-2-pyrrolidone, and where the monomer (1) consists essentially of tetrahydrofurfuryl acrylate, the proportion of said N-vinyl-2-pyrrolidone extends from 0 to 30 parts.

2. A copolymer of monomers comprising (1) 40–75 parts by weight of at least one member selected from the group consisting of (a) tetrahydrofurfuryl acrylate, and (b) alkyl acrylates having 1–8 carbon atoms in the alkyl substituents; (2) 15–45 parts of at least one member selected from the group consisting of N-alkyl-acrylamide and N-alkyl-methacrylamide wherein the alkyl group has 1–8 carbon atoms; and (3) 10–30 parts of N-vinyl-2- pyrrolidone, and where the monomer (1) consists essentially of tetrahydrofurfuryl acrylate, the proportion of said N-vinyl-2-pyrrolidone extends from 0 to 30 parts, the inherent viscosity of said copolymer ranging from about 0.5 to 1.7.

3. A storable flexible adhesive bonding film which may be solvent- and heat-reactivated to form strong bonds to plasticized vinyl resin articles, said adhesive film comprising a solvent-free polymer of monomers comprising (1) 40–75 parts by weight of at least one member selected from the group consisting of (a) tetrahydrofurfuryl acrylate, and (b) alkyl acrylates having 1–8 carbon atoms in the alkyl substituent; (2) 15–45 parts of at least one member selected from the group consisting of N-alkyl-acrylamide and N-alkylmethacrylamide wherein the alkyl group has 1–8 carbon atoms; and (3) 10–30 parts N-vinyl-2-pyrrolidone, and where the monomer (1) consists essentially of tetrahydrofurfuryl acrylate, the proportion of said N-vinyl-2-pyrrolidone extends from 0 to 30 parts.

4. A copolymer of monomers comprising (1) 40–75 parts by weight of tetrahydrofurfuryl acrylate; (2) 15–45 parts of at least one member selected from the group consisting of N-alkyl-acrylamide and N-alkyl-methacrylamide wherein the alkyl group has 1–8 carbon atoms; and (3) 0–30 parts N-vinyl-2-pyrrolidone.

5. A copolymer of monomers comprising (1) 40–75 parts by weight of ethyl acrylate; (2) 15–45 parts of at least one member selected from the group consisting of N-alkyl-acrylamide and N-alkyl-methacrylamide wherein the alkyl group has 1–8 carbon atoms; and (3) 10–30 parts N-vinyl-2-pyrrolidone.

6. A copolymer of monomers comprising (1) 40–75 parts by weight of at least one member selected from the group consisting of (a) tetrahydrofurfuryl acrylate, and (b) alkyl acrylates having 1–8 carbon atoms in the alkyl substituent; (2) 15–45 parts of N-tertiary-butyl - acrylamide; and (3) 10–30 parts of N-vinyl-2-pyrrolidone, and where the monomer (1) consists essentially of tetrahydrofurfuryl acrylate, the proportion of said N-vinyl-2-pyrrolidone extends from 0 to 30 parts.

7. A copolymer of monomers comprising (1) 40–75 parts by weight of tetrahydrofurfuryl acrylate; (2) 15–45 parts of N-alkyl-acrylamide wherein the alkyl group has 1–8 carbon atoms.

8. A copolymer of monomers comprising (1) 40–75 parts by weight of tetrahydrofurfuryl acrylate; (2) 15–30 parts of N-tertiary-butyl-acrylamide; and (3) 10–30 parts N-vinyl-2-pyrrolidone.

9. A copolymer of monomers comprising (1) 40–75 parts by weight of ethyl acrylate; (2) 15–30 parts of N-tertiary-butyl-acrylamide; and (3) 10–30 parts N-vinyl-2-pyrrolidone, the inherent viscosity of said copolymer extending from about 0.5 to 1.7.

References Cited by the Examiner
UNITED STATES PATENTS

| | | | |
|---|---|---|---|
| 2,973,286 | 2/1961 | Ulrich | 260—80.5 |
| 3,044,873 | 7/1962 | Haas | 260—80.5 |

JOSEPH L. SCHOFER, *Primary Examiner.*

W. HOOVER, *Assistant Examiner.*